US012561363B2

(12) United States Patent
Kharbanda et al.

(10) Patent No.: US 12,561,363 B2
(45) Date of Patent: **\*Feb. 24, 2026**

(54) VISUAL SEARCH DETERMINATION FOR TEXT-TO-IMAGE REPLACEMENT

(71) Applicant: Google LLC, Mountain View, CA (US)

(72) Inventors: Harshit Kharbanda, Pleasanton, CA (US); Christopher James Kelley, Orinda, CA (US); Pendar Yousefi, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/999,901

(22) Filed: Dec. 23, 2024

(65) Prior Publication Data

US 2025/0124075 A1 Apr. 17, 2025

Related U.S. Application Data

(63) Continuation of application No. 17/968,430, filed on Oct. 18, 2022, now Pat. No. 12,216,703.

(51) Int. Cl.
| | |
|---|---|
| *G06F 16/532* | (2019.01) |
| *G06F 16/538* | (2019.01) |
| *G06F 16/54* | (2019.01) |

(52) U.S. Cl.
CPC .......... *G06F 16/532* (2019.01); *G06F 16/538* (2019.01); *G06F 16/54* (2019.01)

(58) Field of Classification Search
None
See application file for complete search history.

(56) References Cited

U.S. PATENT DOCUMENTS

| | | | |
|---|---|---|---|
| 8,774,527 | B1 | 7/2014 | Anguelov et al. |
| 8,862,500 | B1 | 10/2014 | Mayfield |
| 9,589,032 | B1 | 3/2017 | Brinck et al. |
| 10,083,521 | B1 | 9/2018 | Dhua et al. |
| 10,157,333 | B1 | 12/2018 | Wang et al. |
| 10,346,723 | B2 | 7/2019 | Han et al. |
| 11,461,386 | B2 | 10/2022 | Sharma et al. |
| 2008/0192978 | A1 | 8/2008 | Rundle et al. |
| 2011/0125735 | A1 | 5/2011 | Petrou |
| 2011/0135207 | A1 | 6/2011 | Flynn et al. |
| 2012/0310968 | A1 | 12/2012 | Tseng |
| 2013/0156275 | A1 | 6/2013 | Amacker et al. |
| 2014/0188884 | A1 | 7/2014 | Morris et al. |
| 2014/0250120 | A1 | 9/2014 | Mei et al. |

(Continued)

OTHER PUBLICATIONS

Bhonge, "VisualRank to Large-Scale Image Retrieval," International Journal of Advanced Engineering Research and Studies, Research Paper, Apr.-Jun. 2012, pp. 137-142.

(Continued)

*Primary Examiner* — Giuseppi Giuliani
(74) *Attorney, Agent, or Firm* — DORITY & MANNING, P.A.

(57) ABSTRACT

Systems and methods for textual replacement can include the determination of a visual intent, which can trigger an interface for selecting an image to replace visual descriptors. The visually descriptive terms can be identified, and an indicator can be provided to indicate the text replacement option may be initiated. An image can then be selected by a user to replace the visually descriptive terms.

20 Claims, 13 Drawing Sheets

(56) References Cited

U.S. PATENT DOCUMENTS

| | | | |
|---|---|---|---|
| 2014/0314319 | A1 | 10/2014 | Hamel et al. |
| 2015/0052431 | A1 | 2/2015 | Zhu et al. |
| 2015/0169645 | A1 | 6/2015 | Li et al. |
| 2016/0011737 | A1 | 1/2016 | Kang et al. |
| 2016/0203525 | A1 | 7/2016 | Hara et al. |
| 2017/0017831 | A1 | 1/2017 | Rollend et al. |
| 2017/0052982 | A1 | 2/2017 | Sirven et al. |
| 2017/0154055 | A1 | 6/2017 | Dimson et al. |
| 2017/0161987 | A1 | 6/2017 | Bulzacki et al. |
| 2017/0242913 | A1 | 8/2017 | Tijssen et al. |
| 2017/0249339 | A1 | 8/2017 | Lester |
| 2017/0270209 | A1 | 9/2017 | Mueller et al. |
| 2017/0304732 | A1 | 10/2017 | Velic et al. |
| 2017/0357878 | A1 | 12/2017 | Sawhney et al. |
| 2018/0158128 | A1 | 6/2018 | Dorner et al. |
| 2019/0121879 | A1 | 4/2019 | Canelis et al. |
| 2019/0205962 | A1 | 7/2019 | Piramuthu et al. |
| 2020/0159765 | A1 | 5/2020 | Manin et al. |
| 2020/0193206 | A1 | 6/2020 | Turkelson et al. |
| 2023/0252072 | A1 | 8/2023 | Kislyuk et al. |

OTHER PUBLICATIONS

Gui et al. "Web Image Retrieval via Learning Semantics of Query Image," 2009 Institute of Electrical and Electronics Engineers International Conference on Multimedia and Expo, New York, New York, United States, Jun. 28-Jul. 3, 2009, 4 pages.

International Preliminary Report on Patentability issued in International Application No. PCT/US2016/065736, mailed on Jan. 10, 2019, 7 pages.

International Search Report and Written Opinion in International Application No. PCT/US2016/065736, mailed on Mar. 6, 2017, 11 pages.

Jansen et al., "Determining the User Intent of Web Search Engine Queries," Sixteenth International Conference on World Wide Web, Banff, Alberta, Canada, May 8-12, 2007, pp. 1149-1150.

Tang et al., "IntentSearch: Capturing User Intention for One-Click Internet Image Search," Transactions on Pattern Analysis and Machine Intelligence, vol. 34, No. 7, Jul. 2012, pp. 1342-1353.

Tian et al., "Active Reranking for Web Image Search," Transactions on Image Processing, vol. 19, No. 3, Mar. 2010, pp. 805-820.

Written Opinion issued in International Application No. PCT/US2016/065736, mailed on Jun. 5, 2018, 5 pages.

Hattori et al., "Search the Web for Peculiar Images by Converting Web-extracted Peculiar Color-Names into Color-Features", 2010 Information Processing of Society of Japan, vol. 3, No. 1, Mar. 2010, 20 pages.

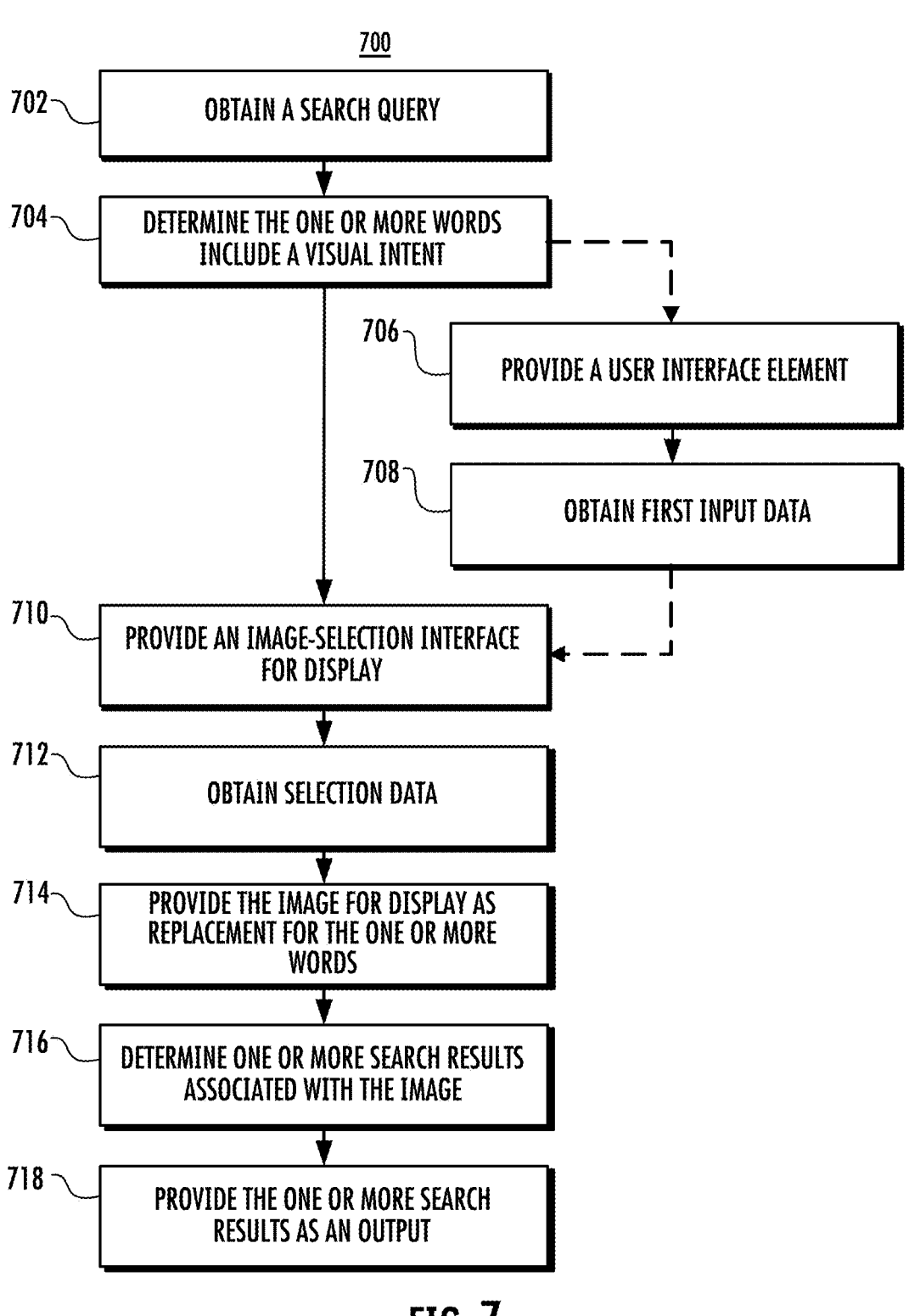

700

702 — OBTAIN A SEARCH QUERY

704 — DETERMINE THE ONE OR MORE WORDS INCLUDE A VISUAL INTENT

706 — PROVIDE A USER INTERFACE ELEMENT

708 — OBTAIN FIRST INPUT DATA

710 — PROVIDE AN IMAGE-SELECTION INTERFACE FOR DISPLAY

712 — OBTAIN SELECTION DATA

714 — PROVIDE THE IMAGE FOR DISPLAY AS REPLACEMENT FOR THE ONE OR MORE WORDS

716 — DETERMINE ONE OR MORE SEARCH RESULTS ASSOCIATED WITH THE IMAGE

718 — PROVIDE THE ONE OR MORE SEARCH RESULTS AS AN OUTPUT

FIG. 7

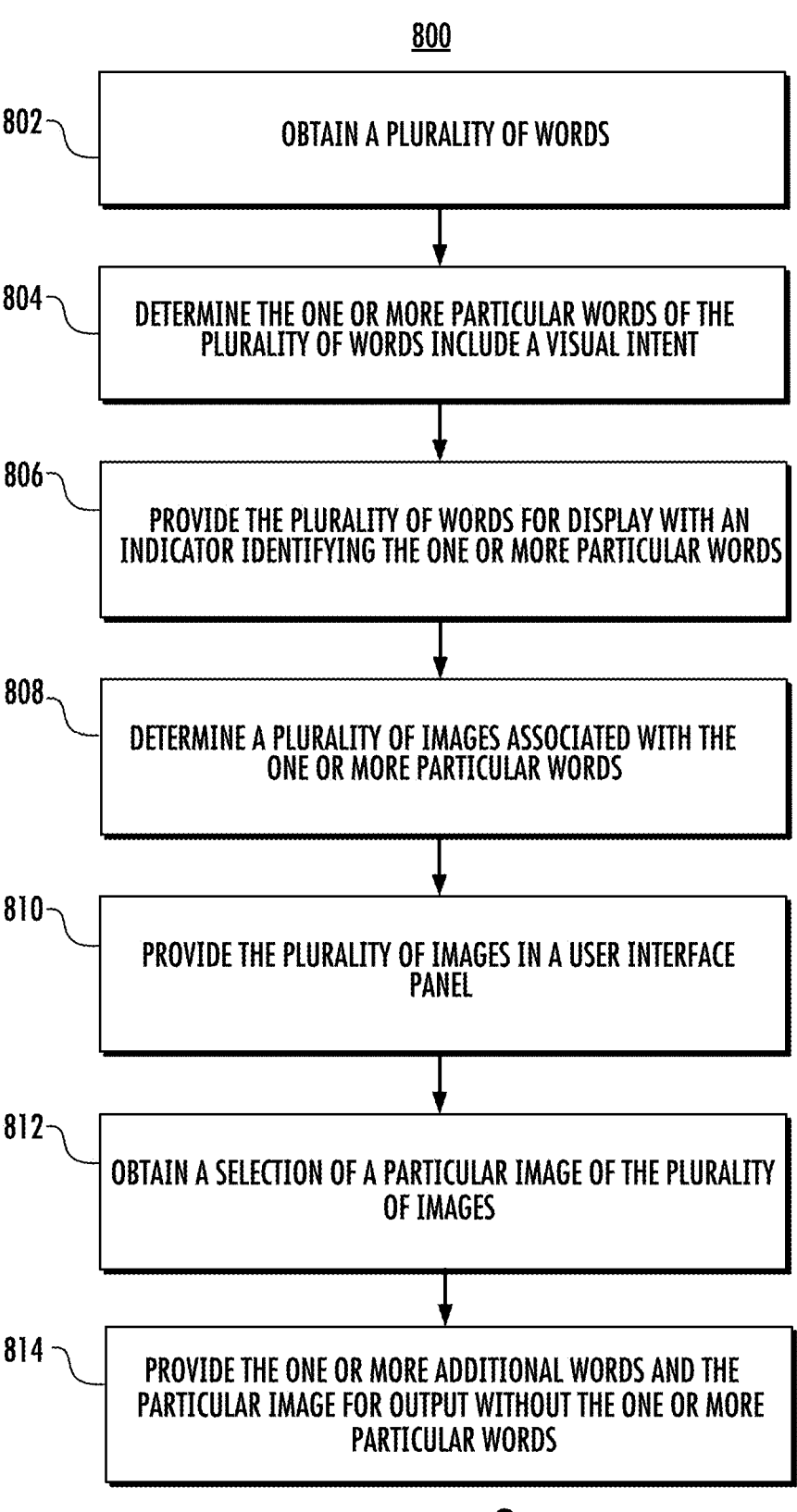

800

802 — OBTAIN A PLURALITY OF WORDS

804 — DETERMINE THE ONE OR MORE PARTICULAR WORDS OF THE PLURALITY OF WORDS INCLUDE A VISUAL INTENT

806 — PROVIDE THE PLURALITY OF WORDS FOR DISPLAY WITH AN INDICATOR IDENTIFYING THE ONE OR MORE PARTICULAR WORDS

808 — DETERMINE A PLURALITY OF IMAGES ASSOCIATED WITH THE ONE OR MORE PARTICULAR WORDS

810 — PROVIDE THE PLURALITY OF IMAGES IN A USER INTERFACE PANEL

812 — OBTAIN A SELECTION OF A PARTICULAR IMAGE OF THE PLURALITY OF IMAGES

814 — PROVIDE THE ONE OR MORE ADDITIONAL WORDS AND THE PARTICULAR IMAGE FOR OUTPUT WITHOUT THE ONE OR MORE PARTICULAR WORDS

FIG. 8

VISUAL SEARCH DETERMINATION FOR TEXT-TO-IMAGE REPLACEMENT

PRIORITY CLAIM

The present application is a continuation of U.S. application Ser. No. 17/968,430 having a filing date of Oct. 18, 2022. Applicant claims priority to and the benefit of each of such application and incorporate all such application herein by reference in its entirety.

FIELD

The present disclosure relates generally to replacing text with an image based on a determined visual intent. More particularly, the present disclosure relates to processing a text string, determining a visual intent, and providing an interface for image insertion.

BACKGROUND

Search queries can include text input to search for a particular item and/or a particular piece of knowledge. For example, a user may want to know the score of a particular sports game. Alternatively, a user may want to know more about a historical figure or may want to find a contact address for a business.

Additionally, users may utilize a search query to find a particular object for purchase and/or to find a particular location. Search queries for particular objects and places can involve descriptive terms that may narrow down the search results obtained but may not capture the specifics the user is attempting to provide.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for multimodal searching. The method can include obtaining, by a computing system including one or more processors, a search query. The search query can include one or more words. The method can include determining, by the computing system, the one or more words includes a visual intent. In some implementations, the visual intent can be associated with one or more visual features. The method can include providing, by the computing system, an image-selection interface for display. The image-selection interface can include a plurality of images for selection. In some implementations, the image-selection interface can be provided for display based on the determination of the one or more words comprising the visual intent. The method can include obtaining, by the computing system, selection data. The selection data can be descriptive of a selection of an image. The method can include providing, by the computing system, the image for display as replacement for the one or more words. In some implementations, the method can include determining, by the computing system, one or more search results associated with the image and providing, by the computing system, the one or more search results as an output.

In some implementations, providing the image-selection interface for display can include providing, by the computing system, a user interface element. The user interface element can be descriptive of a text replacement option.

Providing the image-selection interface for display can include obtaining, by the computing system, first input data. The first input data can be descriptive of a first selection of the text replacement option. Providing the image-selection interface for display can include providing, by the computing system, the image-selection interface for display based on the first input data.

In some implementations, the one or more search results can be provided via a search results page. The search results page can include a query box that displays the image. The search results page can include a search results panel for displaying information associated with the one or more search results. In some implementations, the search query can include one or more additional words. The one or more search results can be determined at least in part on the one or more additional words. In some implementations, obtaining the search query can include obtaining the search query via a query box of a search interface. The one or more search results can include one or more image search results. In some implementations, the one or more search results can include one or more product search results descriptive of products associated with the one or more visual features of the image.

Another example aspect of the present disclosure is directed to a computing system for text-to-image replacement. The system can include one or more processors and one or more non-transitory computer-readable media that collectively store instructions that, when executed by the one or more processors, cause the computing system to perform operations. The operations can include obtaining text data. The text data can be descriptive of a plurality of text characters. The operations can include processing the text data to determine a subset of the plurality of text characters include a visually-descriptive term. In some implementations, the visually-descriptive term can be associated with one or more visual features. The operations can include providing an image-selection interface for display. The image-selection interface can include a plurality of images for selection. In some implementations, the plurality of images can be obtained based at least in part on the visually-descriptive term. The operations can include obtaining selection data. The selection data can be descriptive of a selection of an image. The operations can include providing the image for display as replacement for the subset of the plurality of text characters.

In some implementations, providing the image-selection interface for display can include providing an indicator for display. The indicator can be descriptive of a text replacement option for replacing the visually-descriptive term with image data. Providing the image-selection interface for display can include obtaining first input data. The first input data can be descriptive of a first selection of the text replacement option. Providing the image-selection interface for display can include providing the image-selection interface for display based on the first input data. In some implementations, the indicator can include the subset of the plurality of text characters being displayed in one or more colors that differ from the remaining characters of the plurality of text characters.

In some implementations, the plurality of text characters can include the subset of the plurality of text characters and a second subset. The operations can include processing the image and the second subset to determine a plurality of search results. The plurality of search results can be determined based on the image and the second subset. The operations can include providing the plurality of search results in a search results page interface. In some implementations, the plurality of images can be obtained by: querying a search engine with the subset of the plurality of text characters and receiving the plurality of images. The plurality of images can be obtained by determining image data in a user-specific image database is associated with the one or more visual features. The image data associated with the one or more visual features can include the plurality of images.

In some implementations, providing the image-selection interface for display can include providing an image search option, a user-image database option, and an image-capture option. The image search option can include querying a network of computing systems with the subset of the plurality of text characters. The user-image database option can include obtaining images from a user-image database. The image-capture option can include utilizing one or more image sensors of a user device. In some implementations, the visually-descriptive term can be determined based on historical search data. The historical search data can be descriptive of a plurality of terms that were previously utilized to obtain one or more image search results. In some implementations, the visually-descriptive term can be determined based on processing the text data with a semantic understanding model.

Another example aspect of the present disclosure is directed to one or more non-transitory computer-readable media that collectively store instructions that, when executed by one or more computing devices, cause the one or more computing devices to perform operations. The operations can include obtaining a plurality of words. The plurality of words can include one or more particular words and one or more additional words. The operations can include determining the one or more particular words of the plurality of words comprise a visual intent. In some implementations, the visual intent can be associated with one or more visual features. The operations can include providing the plurality of words for display with an indicator identifying the one or more particular words. The operations can include determining a plurality of images associated with the one or more particular words. The plurality of images can be associated with the visual intent. The operations can include providing the plurality of images in a user interface panel. In some implementations, the user interface panel can include a plurality of interactive user interface elements associated with the plurality of images. The operations can include obtaining a selection of a particular image of the plurality of images and providing the one or more additional words and the particular image for output without the one or more particular words.

In some implementations, the operations can include processing the output to generate a translation output. The translation output can be generated based at least in part on the particular image. The operations can include providing the output to a search engine and receiving a plurality of search results. In some implementations, the plurality of search results can be associated with the one or more additional words and the particular image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts a flow chart diagram of an example method to perform multimodal search according to example embodiments of the present disclosure.

FIG. 8 depicts a flow chart diagram of an example method to perform text-to-image replacement according to example embodiments of the present disclosure.

Figure 1A:
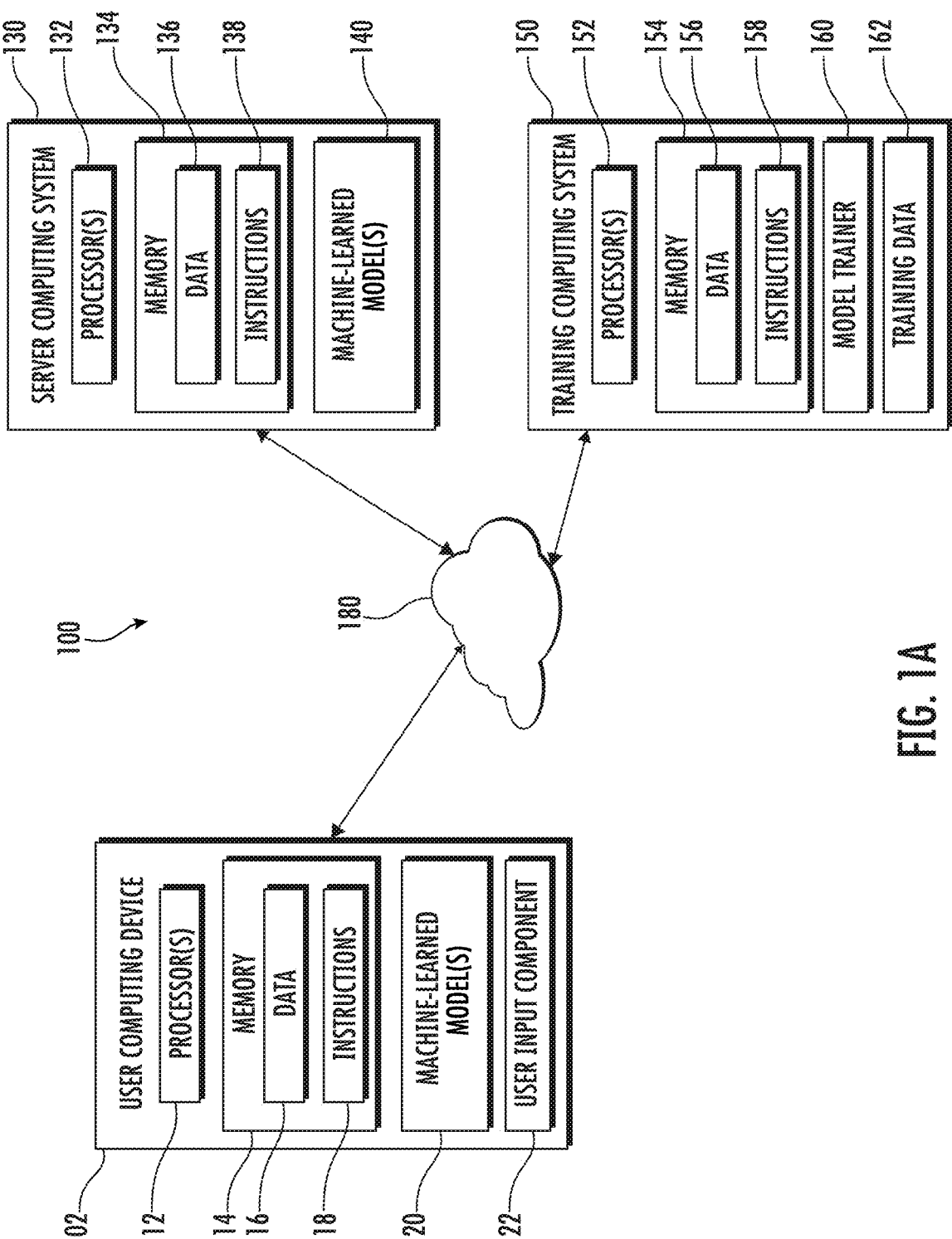
FIG. 1A depicts a block diagram of an example computing system that performs text-to-image determination according to example embodiments of the present disclosure.

Reference numerals that are repeated across plural figures are intended to identify the same features in various implementations.

DETAILED DESCRIPTION

Overview

Generally, the present disclosure is directed to systems and methods for augmenting character strings through the replacement of text with visual tokens (e.g., an image and/or a video). In particular, the systems and methods disclosed herein can leverage visual descriptor determinations to prompt a user to replace text data with visual data to provide a multimodal output. For example, the systems and methods can be utilized to augment a search query to obtain a multi-modal search query that can leverage both text data and image data for querying a database. In some implementations, the systems and methods can include obtaining text data. The text data can be descriptive of a plurality of text characters. The systems and methods can include processing the text data to determine a subset of the plurality of text characters includes a visually-descriptive term. The visually-descriptive term can be associated with one or more visual features. An indicator can be provided for display. The indicator can be descriptive of a text replacement option for replacing the visually-descriptive term with image data. The systems and methods can include obtaining first input data. In some implementations, the first input data can be descriptive of a first selection of the text replacement option. An image-selection interface can be provided for display. The image-selection interface can include a plurality of images for selection. The systems and methods can include obtaining second input data. In some implementations, the second input data can be descriptive of a second selection of an image. The image can be provided for display as replacement for the subset of the plurality of text characters.

The systems and methods can obtain text data. The text data can be descriptive of a plurality of text characters. The plurality of text characters can be descriptive of one or more words. The plurality of characters may be obtained via one or more inputs to a user interface. Alternatively and/or additionally, the text data may be generated by processing audio data associated with a spoken utterance.

The text data can be processed to determine a subset of the plurality of text characters include a visually-descriptive term. The visually-descriptive term can be associated with one or more visual features. In some implementations, the visually-descriptive term can be determined based on historical search data. The historical search data can be descriptive of a plurality of terms that are utilized to obtain one or more image search results. In some implementations, the visually-descriptive term can be determined based on processing the text data with a semantic understanding model. The visual descriptive term may be determined based on historical click data. The historical selection data may be global selection data, user-specific historical selection data, region-specific historical selection data, and/or context-specific historical selection data. In some implementations, the historical selection data can be descriptive of a frequency of an image search tab being selected when the particular term is input.

The systems and methods can provide an indicator for display. The indicator can be descriptive of a text replacement option for replacing the visually-descriptive term with image data. The indicator can include the subset of the plurality of text characters being displayed in one or more colors that differ from the remaining characters of the plurality of text characters. In some implementations, the indicator can include a pop-up user-interface element. The indicator may include highlighting the one or more words, underlining the one or more words, circling the one or more words, and/or flashing the one or more words.

First input data can then be obtained. The first input data can be descriptive of a first selection of the text replacement option. The first input data can be descriptive of an audio input (e.g., a voice command), a touch input (e.g., an input to a touchscreen), a keyboard input, and/or a mouse input. The first input data can include a selection of the indicator.

An image-selection interface can then be provided for display. The image-selection interface can include a plurality of images for selection. The plurality of images can be obtained by determining image data in a user-specific image database includes the plurality of images. In some implementations, the plurality of images can be associated with the one or more visual features. In some implementations, plurality of images can be obtained based on the one or more visually-descriptive terms. In some implementations, the image-selection interface can be provided immediately following the determination of the visually-descriptive term. Alternatively and/or additionally, the image-selection interface may be provided in response to receiving the first input data.

In some implementations, the plurality of images can be obtained by querying a search engine with the subset of the plurality of text characters and receiving the plurality of images. The query utilized to query the search engine can include the visually-descriptive term. Additionally and/or alternatively, the one or more contexts can be obtained and/or determined. The one or more contexts can then be utilized to refine the search. The one or more contexts can include user-specific information (e.g., a location of the user, application history, user's search history, user's purchase history, user preferences, and/or user profiles). In some implementations, the one or more contexts can include a time of day, a time of week, a time of year, global trends, and/or past selections of images when the particular visually-descriptive term is utilized.

Additionally and/or alternatively, providing the image-selection interface for display can include providing an image search option, a user-image database option, and an image-capture option. The image search option can include querying the web (e.g., network of computing systems) with the subset of the plurality of text characters. The user-image database option can include obtaining images from a user-image database. The image-capture option can include utilizing one or more image sensors of a user device. The user-image database can be associated with one or more user profiles and may be associated with one or more image gallery applications. In some implementations, the user-image database option can allow for the selection of locally stored data. Alternatively and/or additionally, the user-image database option can enable a user to select images stored in association with the user in one or more image storage applications, which can include cloud storage, server storage, and/or local storage.

The systems and methods can obtain second input data (e.g., selection data). The second input data can be descriptive of a second selection of an image. The second input data can be descriptive of an audio input (e.g., a voice command), a touch input (e.g., an input to a touchscreen), a keyboard input, and/or a mouse input. The first input data can include a selection of a selection icon, a selection of a thumbnail, and/or a drop and drag selection.

The image can then be provided for display as replacement for the subset of the plurality of text characters. For example, the subset of the plurality of text characters may be removed, and the image may be added in the position of the subset of the plurality of text characters before deletion.

In some implementations, the plurality of text characters can include the subset of the plurality of text characters and a second subset. The systems and methods may include processing the image and the second subset to determine a plurality of search results. In some implementations, the plurality of search results can be determined based on the image and the second subset. The plurality of search results can then be provided in a search results page interface.

The systems and methods can be utilized for multimodal search. In particular, one or more words of a query string may be replaced with an image to generate a more comprehensive search query. For example, the systems and methods can include obtaining a search query. The search query can include one or more words. The one or more words can be determined to include a visual intent. In some implementations, the visual intent can be associated with one or more visual features. The systems and methods can include providing an image-selection interface for display. The image-selection interface can include a plurality of images for selection. In some implementations, the image-selection interface can be provided for display based on the determination of the one or more words including the visual intent. The systems and methods can include obtaining selection data. The selection data can be descriptive of a selection of an image. The image can then be provided for display as replacement for the one or more words. Additionally and/or alternatively, the systems and methods can include determining one or more search results associated with the image and providing the one or more search results as an output.

The systems and methods can obtain a search query. The search query can include one or more words. In some implementations, obtaining the search query can include obtaining the search query via a query box of a search interface. The search interface can be provided by a web platform, a mobile application, and/or a desktop application. The search query can include Boolean terms and syntax and/or natural language structure.

The one or more words can be determined to include a visual intent. The visual intent can be associated with one or more visual features. The visual intent can be based on the one or more words being associated with a color, a pattern, a design, an object, and/or a visual feature. The association can be based on the one or more words being visual descriptors, the one or more words being associated with a label for a specific visual feature, and/or the one or more words being associated with past image search queries. Words describing a color, a pattern, a shape, and/or other visual descriptors may be determined to include a visual intent.

The systems and methods can provide a user interface element. In some implementations, the user interface element can be descriptive of a text replacement option. The user interface element can be an indicator that indicates the systems and methods have determined the one or more words are associated with a visual intent. The user interface element can include a visual effect. The user interface element can include a pop-up element, a dropdown menu, a change to the display of the one or more words, and/or the appearance of an icon.

The systems and methods can then obtain first input data. The first input data can be descriptive of a first selection of the text replacement option. The first input data can include sensor data. The first input data may be descriptive of an interaction with the user interface element (e.g., a tap input, a gesture input, and/or a lack of an input via a threshold amount of time elapsing without an input being obtained).

An image-selection interface can then be provided for display. The image-selection interface can include a plurality of images for selection. The image-selection interface may include one or more different tabs for viewing and selecting images from different databases and/or images of different mediums or types. The image-selection interface may include one or more panels for providing different types of media content items and/or media content items from different sources.

The systems and methods can then obtain second input data (e.g., selection data). The second input data (e.g., the selection data) can be descriptive of a selection of an image.

The second input data can include sensor data. The second input data may be descriptive of an interaction with the image-selection interface (e.g., a tap input, a gesture input, and/or a lack of an input via a threshold amount of time elapsing without an input being obtained).

The image can then be provided for display as replacement for the one or more words. For example, a preview and/or a thumbnail for the image may be provided for display in the query box of the search interface.

The systems and methods can include determining one or more search results associated with the image. In some implementations, the one or more search results can be provided via a search results page. The search results page can include a query box that displays the image. Additionally and/or alternatively, the search results page can include a search results panel for displaying information associated with the one or more search results. The search query can include one or more additional words. In some implementations, the one or more search results can be determined at least in part on the one or more additional words. The one or more search results may include one or more image search results. Additionally and/or alternatively, the one or more search results can include one or more product search results descriptive of products associated with the one or more visual features of the image.

The one or more search results can be provided as an output. The one or more search results may be provided for display in a search results page interface. The search results may be provided in different panels based on the type of search result, the source of the search result, and/or the classification of the search result.

The systems and methods can include obtaining a plurality of words. The plurality of words can include one or more particular words and one or more additional words. The systems and methods can include determining the one or more particular words of the plurality of words include a visual intent. The plurality of words can be provided for display with an indicator identifying the one or more particular words. The systems and methods can include determining a plurality of images associated with the one or more particular words. The plurality of images can be provided in a user interface panel. The systems and methods can include obtaining a selection of a particular image of the plurality of images and providing the one or more additional words and the particular image for output without the one or more particular words.

The systems and methods can include obtaining a plurality of words. The plurality of words can include one or more particular words and one or more additional words. The one or more particular words can include visually descriptive terms. The one or more additional words may be complementary to the one or more particular words and/or may be directed to a different descriptive aspect of a search query or phrase.

The systems and methods can then include determining the one or more particular words of the plurality of words include a visual intent. The determination can be based on processing the plurality of words with one or more machine-learned models to generate one or more outputs. The one or more machine-learned models can include one or more detection models, one or more segmentation models, one or more classification models, and/or one or more augmentation models. In some implementations, the one or more machine-learned models can include one or more natural language processing models. The one or more machine-learned models can include one or more transformer models. In some implementations, the determination may be based on historical search data.

The plurality of words can be provided for display with an indicator identifying the one or more particular words. The indicator can be a visual indicator that is descriptive of one or more possible actions that can be performed based on the identified one or more particular words. The indicator may include a description, may include a text color change, may include a highlight, and/or may include a pop-up element.

A plurality of images associated with the one or more particular words can then be determined. The determination may be based on querying a database with the one or more particular words. The database may be a local database stored on a user's device and/or may be a database accessed over a network connection. The one or more images may be cropped to isolate a particular portion of the image associated with the one or more particular words.

The plurality of images can then be provided for display in a user interface panel. The user interface panel may be a pop-up panel and/or may replace a portion of the originally displayed interface.

A selection of a particular image of the plurality of images can be obtained. In some implementations, the particular image can be a cropped image from an image database. The cropped image may be generated by processing an uncropped image with one or more machine-learned models to detect a relevant portion of the image and segment the relevant portion from the uncropped image.

The one or more additional words and the particular image can be provided as output without the one or more particular words. The particular image can be positioned in the location where the one or more particular words were previously displayed. In some implementations, a thumbnail and/or a preview may be provided for display in place of the full particular image.

In some implementations, the systems and methods can include processing the output to generate a translation output. The translation output can be generated based at least in part on the particular image.

Alternatively and/or additionally, the systems and methods can include providing the output to a search engine and receiving a plurality of search results. The plurality of search results may be associated with the one or more additional words and the particular image.

Users may be used to expressing parts of a question that are visual-in-nature with text; however, some parts of questions may be better represented with an image. For example, a user may be inspired by a dress they saw on social media; however, the user may want the pattern on socks instead. To search for the socks with the particular pattern, the user may input the query "socks with a colorful floral pattern", but "colorful floral pattern" may lose fidelity of their intent. A more on point search may be if "colorful floral pattern" were replaced by the actual image the user saw.

The systems and methods disclosed herein can detect strings that appear to have visual intent and may highlight that part of the string. When a user taps on the highlight, the systems and methods may trigger visual search tools and may give users an easy way to swap out the string for an image token.

The systems and methods of the present disclosure provide a number of technical effects and benefits. As one example, the system and methods can provide a text-to-image replacement interface. In particular, the systems and methods disclosed herein can leverage an interactive user interface to determine candidate images to provide to a user for selection to replace one or more words.

Another technical benefit of the systems and methods of the present disclosure is the ability to leverage visual intent determination to determine when and to what extent the text-to-image replacement interface may be provided. For example, the systems and methods can determine that one or more words are associated with a visual intent. The systems and methods can determine that an indicator will be provided to enable a user to open a text-to-image replacement interface to replace the one or more words with one or more images.

Another example of technical effect and benefit relates to improved computational efficiency and improvements in the functioning of a computing system. For example, the systems and methods disclosed herein can leverage the text-to-image replacement to provide a more comprehensive multimodal search query that can mitigate the use of additional searches and additional search result page browsing, which can save time and computational power.

With reference now to the Figures, example embodiments of the present disclosure will be discussed in further detail.

Example Devices and Systems

FIG. 1A depicts a block diagram of an example computing system 100 that performs text-to-image determination according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more visual intent determination models 120. For example, the visual intent determination models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example visual intent determination models 120 are discussed with reference to FIGS. 2A-5.

In some implementations, the one or more visual intent determination models 120 can be received from the server computing system 130 over network 180, stored in the user computing device memory 114, and then used or otherwise implemented by the one or more processors 112. In some implementations, the user computing device 102 can implement multiple parallel instances of a single visual intent determination model 120 (e.g., to perform parallel visual intent determination across multiple instances of a text string).

More particularly, the visual intent determination model 120 can process one or more words to determine if the one or more words are associated with a visual intent. The visual intent determination model 120 can include one or more classification models, one or more segmentation models, and/or one or more detection models. The visual intent determination model 120 may include a natural language model. In some implementations, the visual intent determination model 120 may generate a semantic understanding output descriptive of a semantic understanding of a text string.

Additionally or alternatively, one or more visual intent determination models 140 can be included in or otherwise stored and implemented by the server computing system 130 that communicates with the user computing device 102 according to a client-server relationship. For example, the visual intent determination models 140 can be implemented by the server computing system 140 as a portion of a web service (e.g., a text-to-image replacement service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned visual intent determination models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2A-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the visual intent determination models 120 and/or 140 based on a set of training data 162. The training data 162 can include, for example, training words and phrases, ground truth labels, historical search queries, historical selection data associated with query refinement, large language datasets, and/or ground truth semantic intent mapping.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
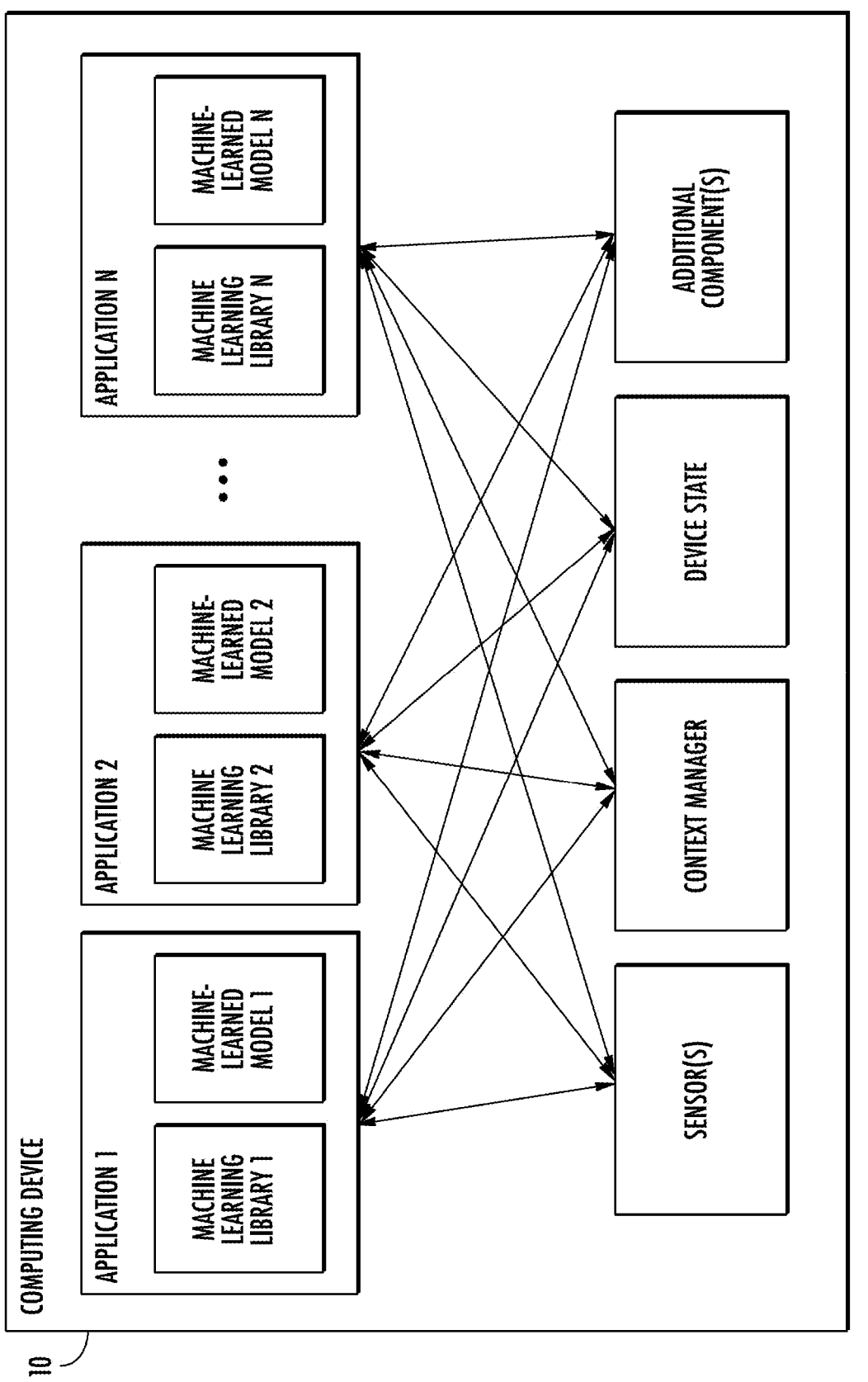
FIG. 1B depicts a block diagram of an example computing device that performs text-to-image determination according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
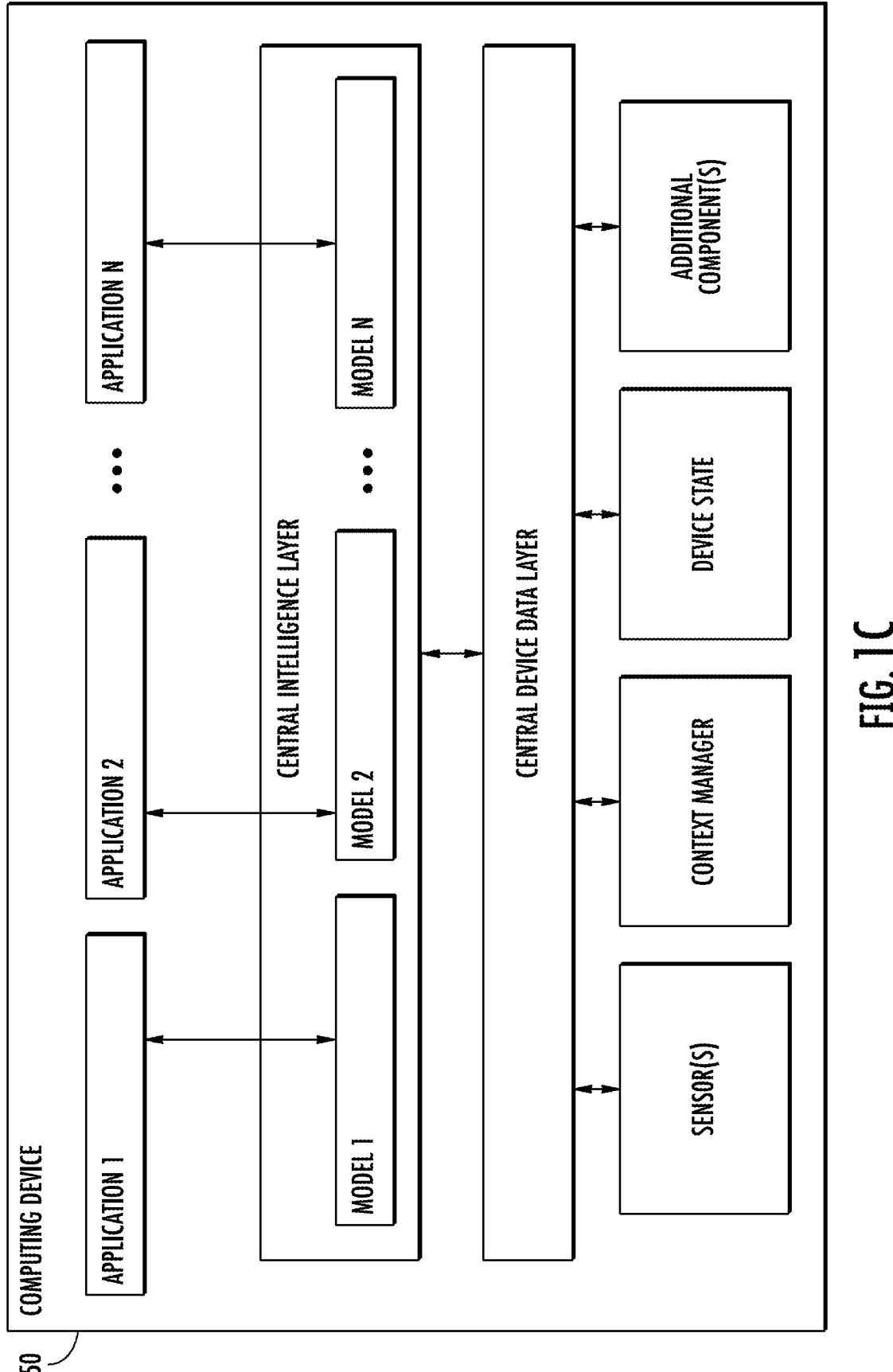
FIG. 1C depicts a block diagram of an example computing device that performs text-to-image determination according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

Figure 2A:
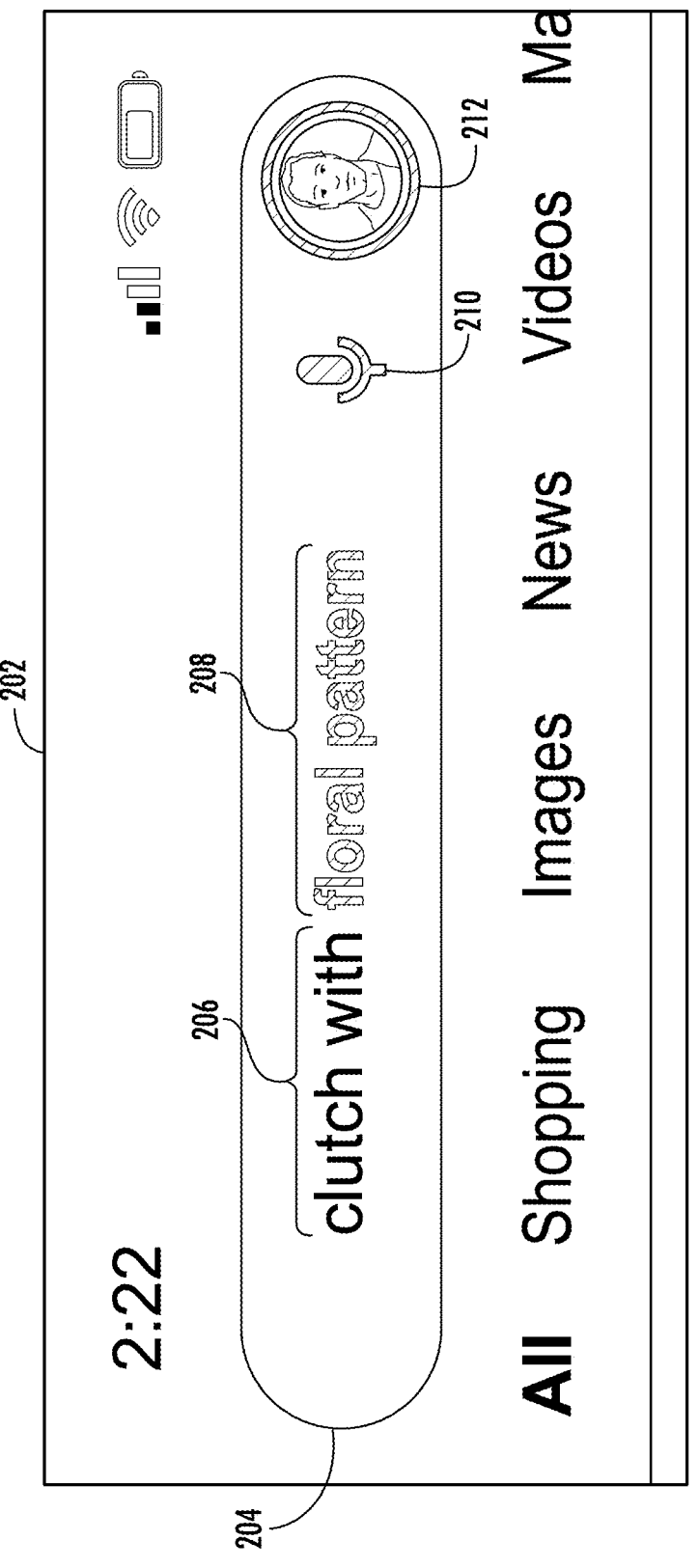
FIG. 2A depicts an illustration of an example query indicator according to example embodiments of the present disclosure.

FIG. 2A depicts an illustration of an example query indicator according to example embodiments of the present disclosure. In particular, FIG. 2A depicts a query input box 204 in a search interface 202. The query input box 204 can be configured to receive and/or display input text strings to be utilized as a search query. For example, a user may have provided one or more inputs to generate the search query "clutch with floral pattern." The search query can be processed to determine one or more particular words 208 are associated with a visual intent. The one or more particular words 208 can then be provided for display with an indicator (e.g., the one or more particular words 208 can be provided in a different color and/or highlighted). The one or more other words 206 in the search query can be provided for display in a normal format and/or in a different indicator.

The indicator associated with the visual intent can be selected to initiate an image selection interface being generated and/or provided. The indicator(s) may be provided in real-time during input and/or may be provided when the search query is processed, and the search results are provided for display.

In some implementations, the search query may be input via a keyboard (e.g., a physical keyboard and/or a graphical keyboard), via a mouse, and/or via a voice input (e.g., a user may select a voice command icon 210 to start the recording of a voice utterance for processing and transcribing). Additionally and/or alternatively, the visual intent determination and/or the ranking of the search results may be based in part on a user profile 212.

Figure 2B:
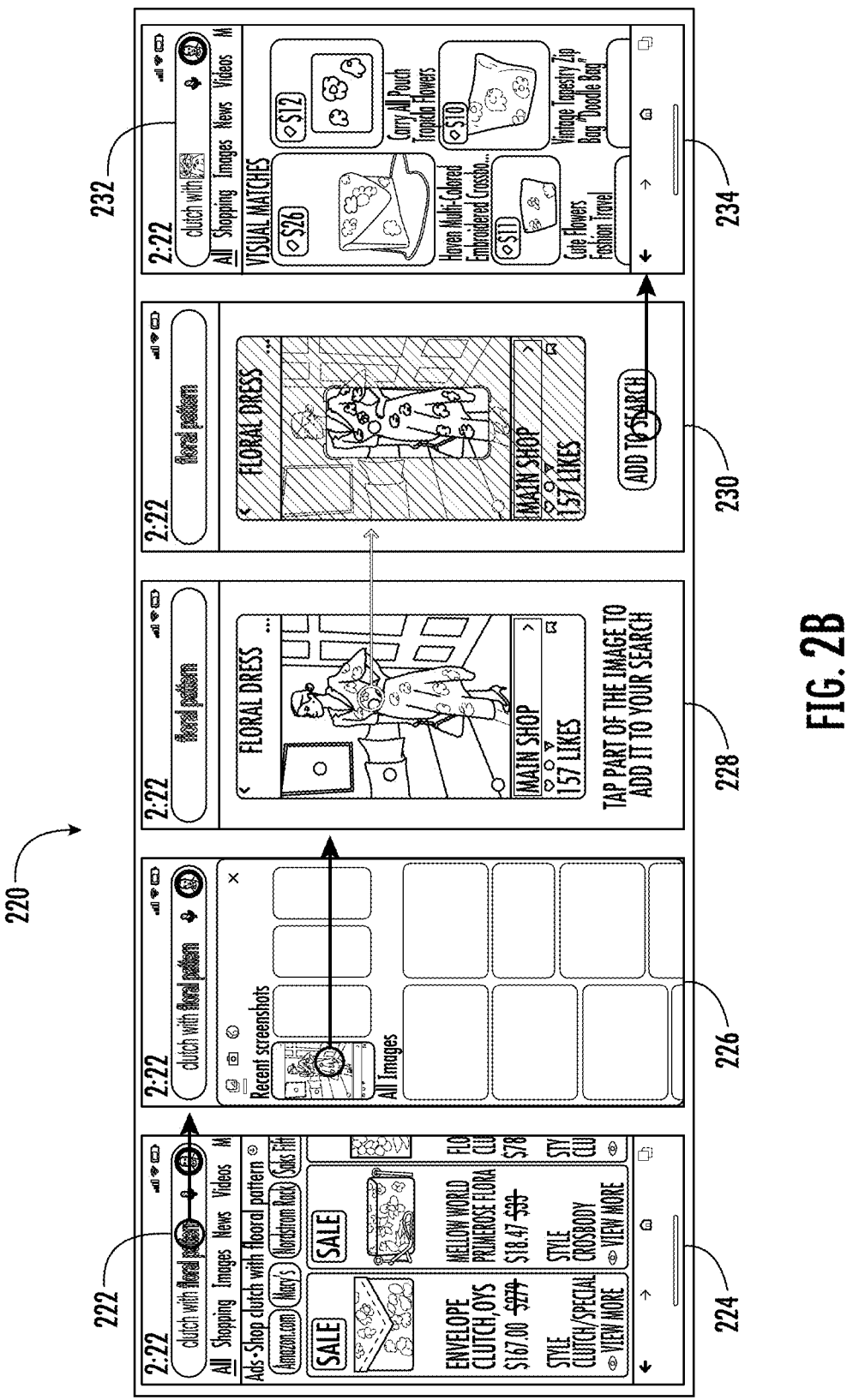
FIG. 2B depicts an illustration of an example image selection interface according to example embodiments of the present disclosure.

FIG. 2B depicts an illustration of an example image selection interface 220 according to example embodiments of the present disclosure. In particular, FIG. 2B depicts an illustration of an image selection interface 220 for selecting images from a user-specific image gallery. For example, an indicator may be provided in the search query input box 222, which can be selected to transition from a search results page 224 to an initial image selection page 226. The image selection page 226 may include a plurality of panels, which can include a recent images panel, an all images panel, and/or relevance panel. The recent images panel can include the most recently saved images. The all images panel can include an interface for accessing all images in the user-specific image gallery. The all images panel can include the images ordered based on the image's save date, the image's name, and/or a relevancy of the image to the one or more particular words associated with the visual intent. The relevance panel can include one or more images from the user-specific image gallery that are determined to be the most relevant to the one or more particular words and/or the visual intent. The relevance may be determined based on one or more detected features in the image, metadata for the image, the source of the image, the name of the image, and/or the location of the image capture.

Once an image is selected, the selected image may be processed to determine regions of interest. An indicator may be provided for display with each candidate region of interest in a region selection interface 228. The regions of interest may be determined based on the image being processed by one or more machine-learned models to detect one or more features in the image. A user can then select a particular candidate region, which can cause a cropping interface 230 to be provided. The cropping interface 230 can provide a suggested cropping region based on the selected candidate region and/or based on one or more other user inputs.

Once the cropped region is confirmed, the image 232 (or a thumbnail of the image) can replace the one or more particular words and can be provided for display in the query input box. The search results can then be refined based on the image, which can cause an updated search results page 234 to be provided for display.

Figure 2C:
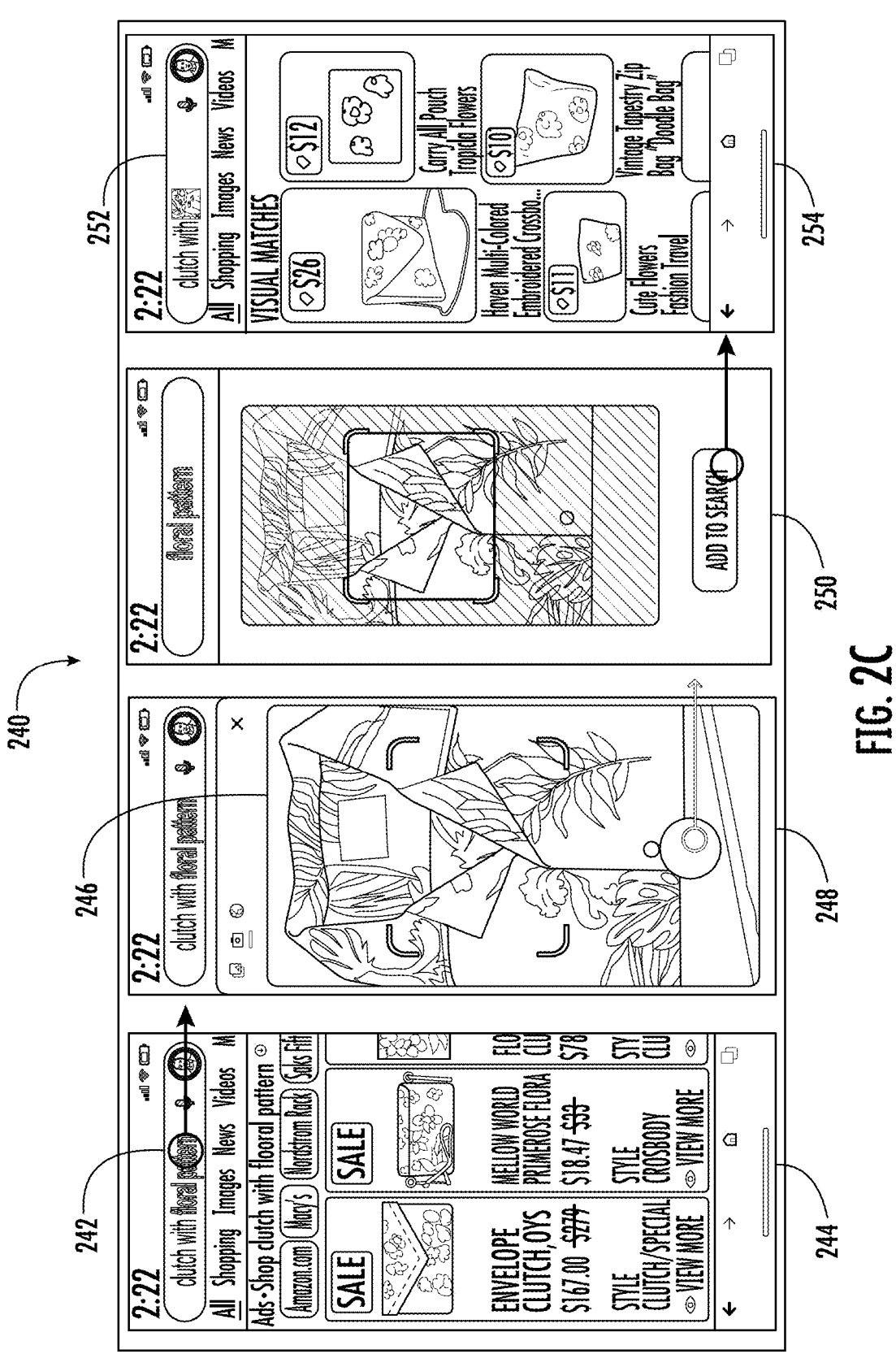
FIG. 2C depicts an illustration of an example image selection interface according to example embodiments of the present disclosure.

FIG. 2C depicts an illustration of an example image selection interface 240 according to example embodiments of the present disclosure. In particular, FIG. 2C depicts an illustration of an example image selection interface 240 for capturing an image. For example, a search query can be provided, the search query can be processed to determine a visual intent, and an indicator 242 can be provided. Selection of the indicator 242 can transition the search interface from a search results interface 244 to an image capture interface 248. The image capture option may be selected from a plurality of options 246 provided by the image selection interface 240.

An image can then be captured using one or more image sensors of a user's computing device. The image selection interface 240 may then provide a cropping option 250 to a user. The cropping option 250 may include an automatically suggested cropping region. Alternatively and/or additionally, the cropping option 250 may enable the user to manually crop the captured image to provide a more specific region for input.

The cropped region can then be added to the search query (e.g., to replace the visually-descriptive terms and/or to complement the visually-descriptive terms) to generate a multimodal query 252. A plurality of search results can then be provided in an updated search results interface 254 based on the multimodal query 252.

Figure 2D:
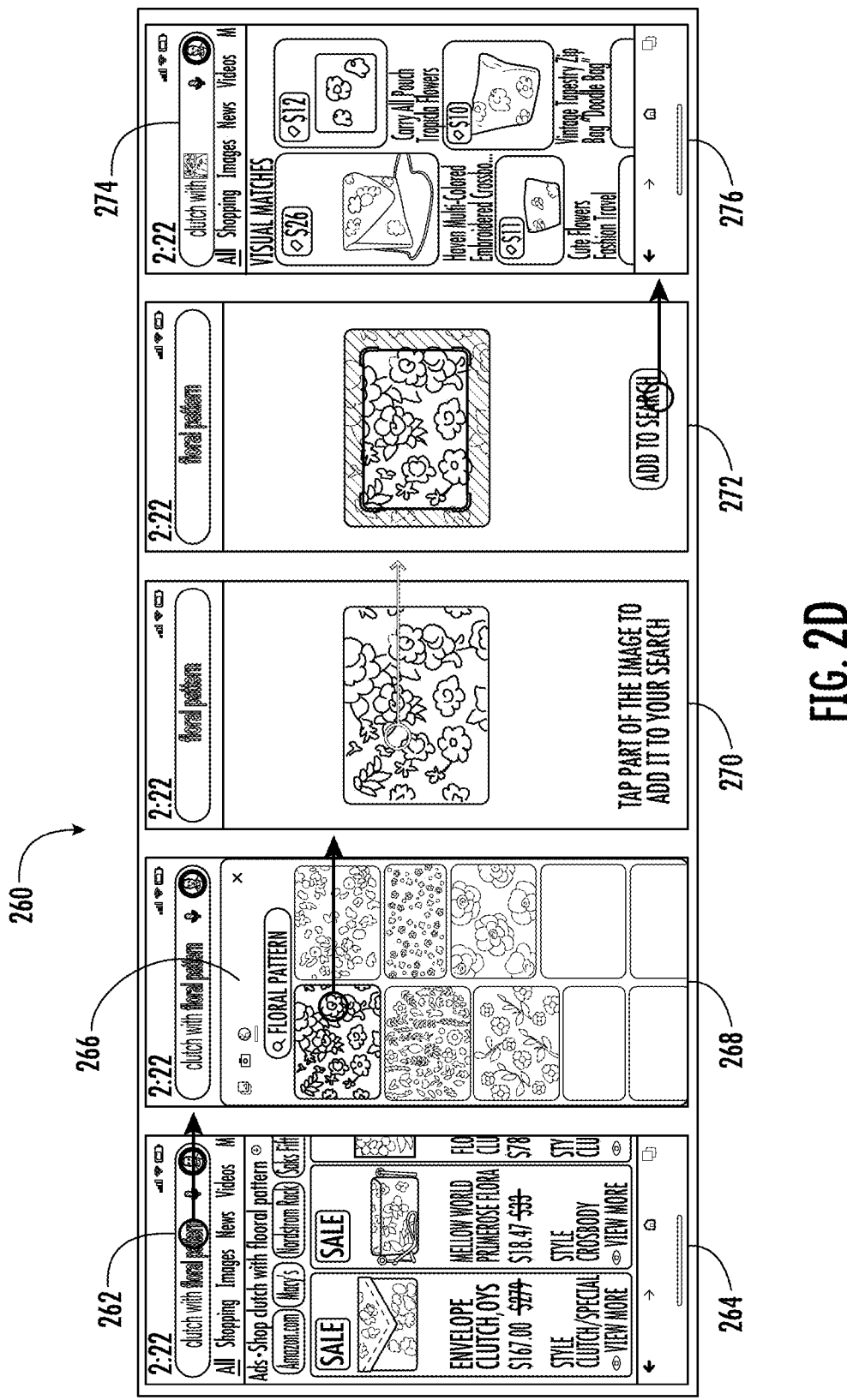
FIG. 2D depicts an illustration of an example image selection interface according to example embodiments of the present disclosure.

FIG. 2D depicts an illustration of an example image selection interface 260 according to example embodiments of the present disclosure. In particular, FIG. 2D depicts an example image selection interface 260 for selecting images using a search engine. For example, a search query can be provided, the search query can be processed to determine a visual intent, and an indicator 262 can be provided. Selection of the indicator 262 can transition the search interface from a search results interface 264 to an image search interface 268. The image search option may be selected from a plurality of options 266 provided by the image selection interface 260.

The image search interface 268 can process the one or more particular words of the search query associated with the visual intent to determine a plurality of candidate images. A user may then select a particular image, which can transition the image selection interface 260 to a region selection stage 270. The user can select a region, and the image selection interface 260 can provide a cropping option 272, which may enable automatic cropping and/or manual cropping.

An updated search results page 276 can then be provided once the cropping is completed. The search results of the updated search results page 276 can be based on a multimodal query 274 that includes one or more words of the original search query and at least a portion of the selected image.

Figure 3:
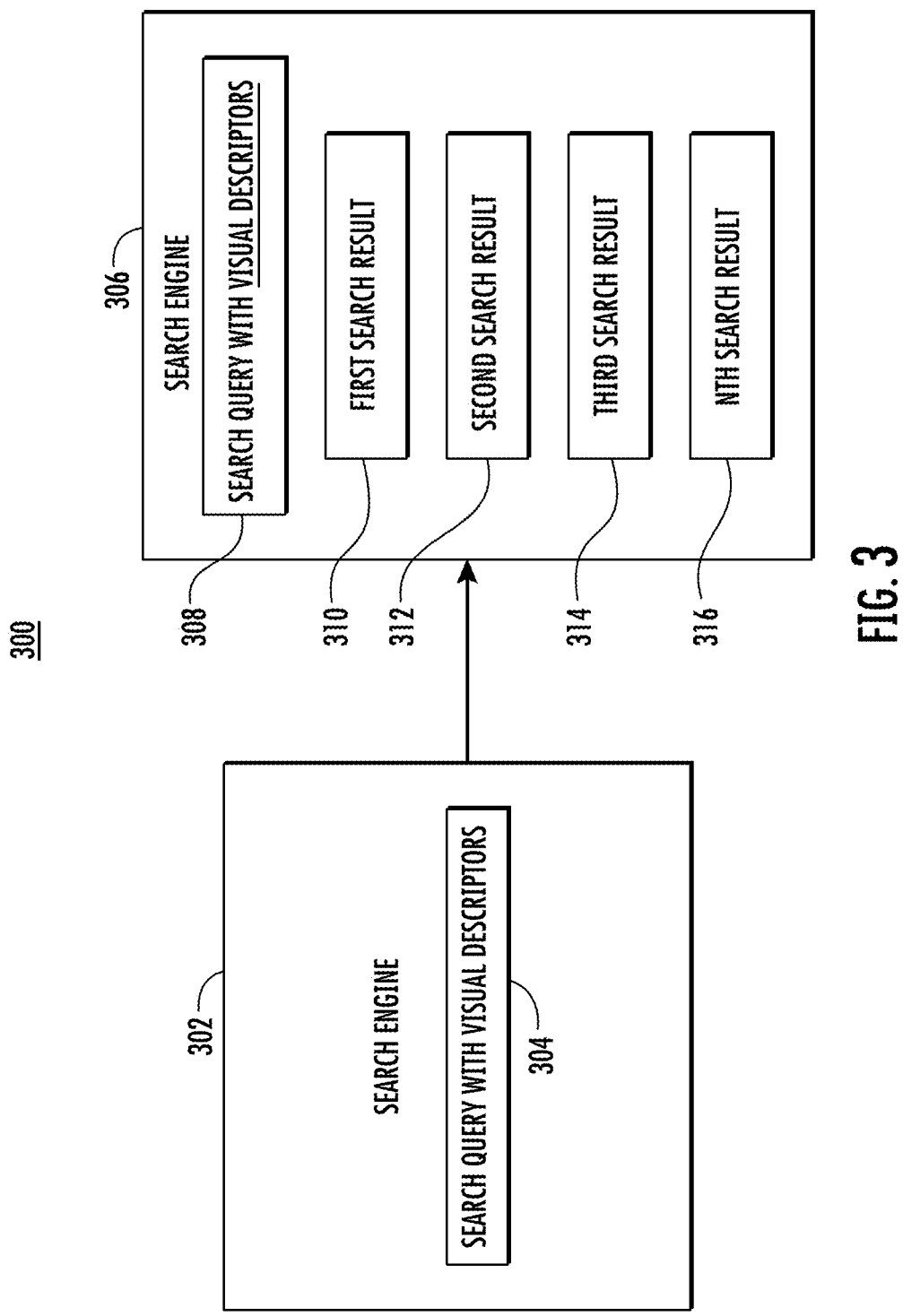
FIG. 3 depicts a block diagram of an example search interface according to example embodiments of the present disclosure.

FIG. 3 depicts a block diagram of an example search interface 300 according to example embodiments of the present disclosure. The systems and methods disclosed herein can enable the augmentation of a search query 304 to generate a multimodal search query that can be processed by a search engine 302. The search query 304 can be input into a query input box of the search engine 302 and may include visual descriptors associated with a visual intent.

The search query 304 can be processed to determine a plurality of search results, which can be utilized to generate a search results page 306. The search results page 306 can include a query input box with a search query with an indicator 308 to indicate the one or more determined visual descriptors. The search query with the indicator 308 can indicate that a visual intent was determined and that an interface can be opened to refine the search by generating a multimodal search query. The search results page 306 may include a first search result 310, a second search result 312, a third search result 314, and/or an nth search result 316. Based on the refinement of the search by generating a multimodal search query, the search results page 306 may be updated to include the same search results with differing rankings, different search results, and/or a mix of new search results and previously displayed search results.

Figure 4:
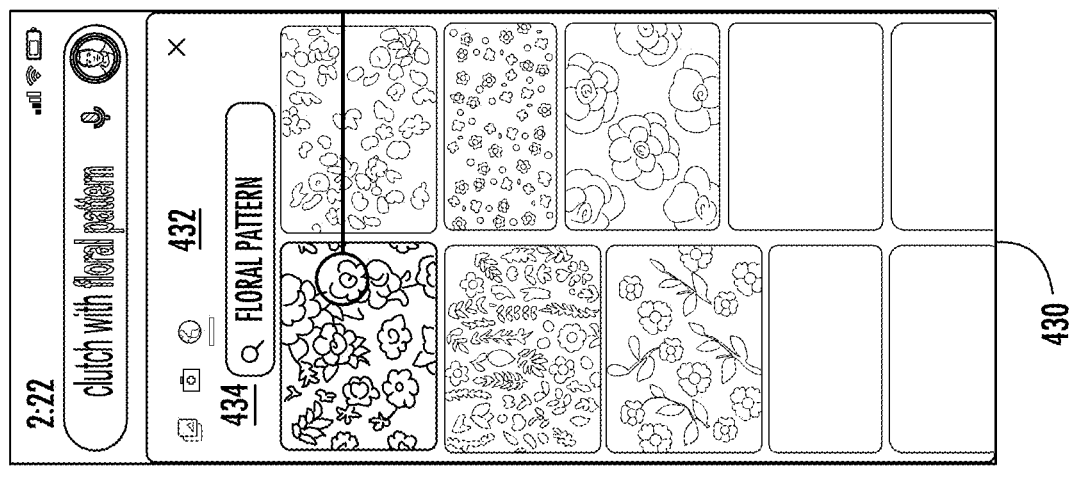
FIG. 4 depicts illustrations of example image selection interfaces according to example embodiments of the present disclosure.
Figure 4:
Figure 4:
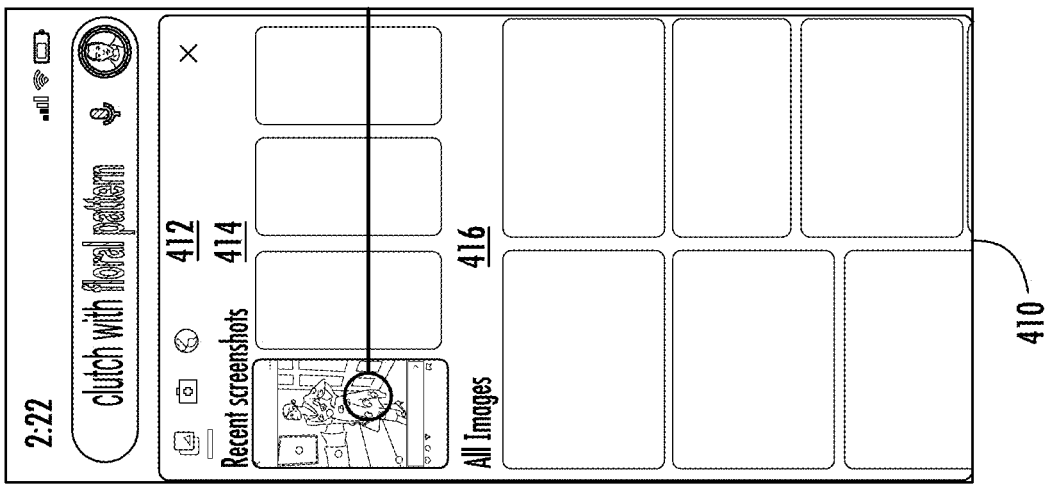

FIG. 4 depicts illustrations of example image selection interfaces 400 according to example embodiments of the present disclosure. In some implementations, a user-specific image gallery option 410, an image capture option 420, and/or an image search option 430 may be provided in response to a selection of a text-to-replacement option. The user-specific image gallery option 410, the image capture option 420, and the image search option 430 may each have their own respective icon that can be associated with the particular option. The icons may be selectable in order to navigate from one option to another option. For example, the user-specific image gallery option 410 can be associated with an overlapping tiles icon 412, the image capture option 420 can be associated with a camera icon 422, and the image search option 430 can be associated with an earth icon 432 to indicate the global search of images.

Each option may provide different and/or overlapping sources for images. The user-specific image gallery option 410 can provide images from one or more image galleries specifically associated with the user. The image galleries can be locally stored on a user device and/or stored on a server computing system. The user-specific image gallery option 410 may include different panels for interactions, which can include a recent screenshots panel 414, recent camera capture panel, and/or an all images panel 416.

The image capture option 420 can utilize one or more image sensors of a user device and may include an image capture user interface element 424 for determining when and/or what to take a picture of in the environment.

The image search option 430 can leverage a search engine to obtain image data from a plurality of sources on the internet. The image search option 430 may utilize one or more words of an input search query to query a search engine. In some implementations, a new query may be input via a dedicated search query box 434. Alternatively and/or additionally, the one or more words may be adjusted. A plurality of image search results can be displayed and/or interacted with by the user.

Figure 5:
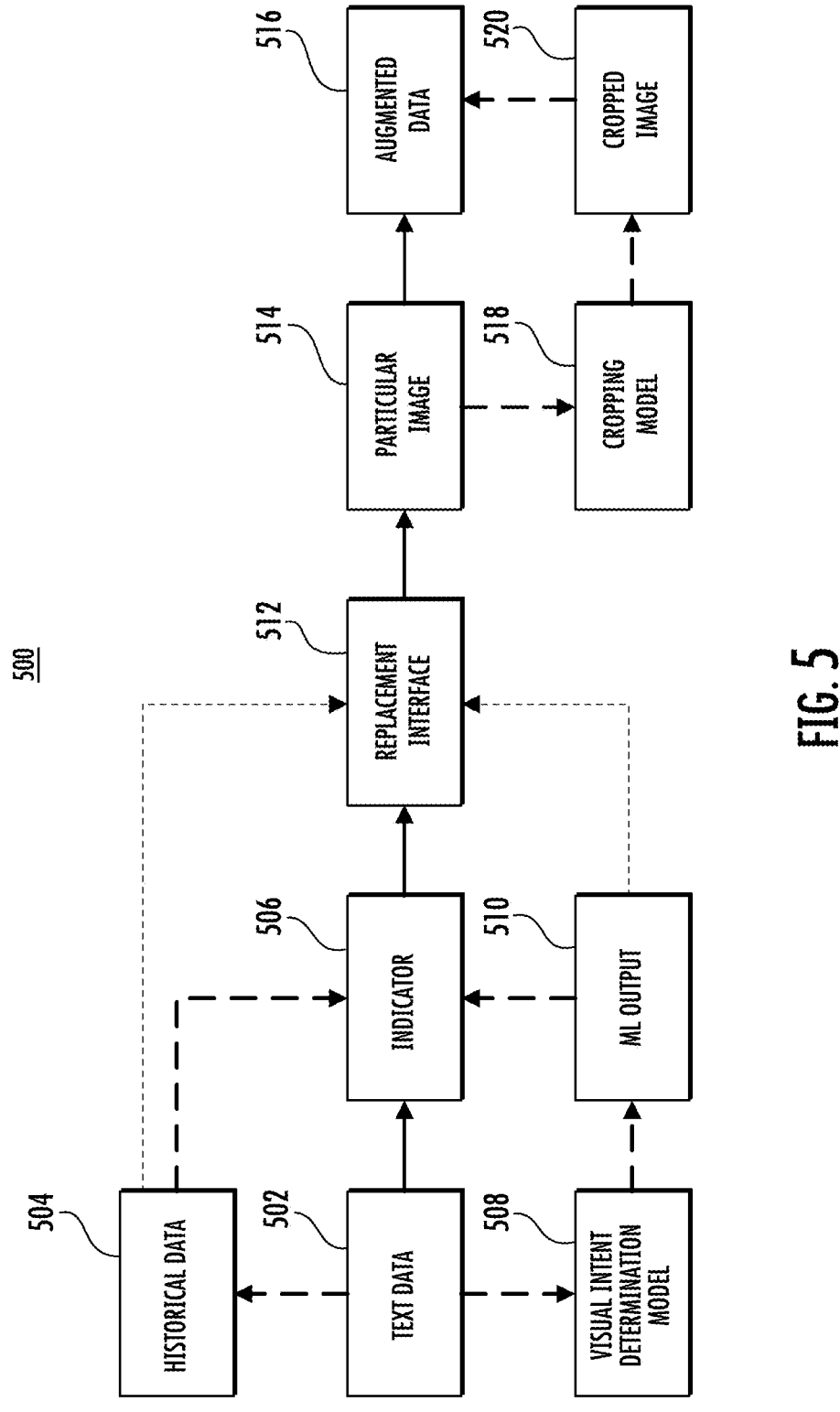
FIG. 5 depicts a block diagram of an example text-to-image replacement system according to example embodiments of the present disclosure.

FIG. 5 depicts a block diagram of an example text-to-image replacement system 500 according to example embodiments of the present disclosure. The text-to-image replacement system 500 can process text data 502 to generate augmented data 516. The text data 502 can be descriptive of a plurality of characters associated with one or more words. The one or more words can be associated with a search query, a text string in a blog, a text string in a message, and/or a response to a question or prompt.

The text data 502 can be processed to determine one or more particular words associated with the text data 502 is associated with a visual intent (e.g., the one or more words are visually-descriptive words (e.g., describe one or more visual features)). The determination can be made based on historical data 504, heuristics, and/or based on one or more machine-learned models (e.g., a visual intent determination model 508). For example, the historical data 504 can be descriptive of past interactions by users when the one or more particular words were used. In some implementations, the user and/or a plurality of users may refine search results to images when using the one or more particular words. Alternatively and/or additionally, the one or more particular words may be often used in describing images (e.g., in image captions). The one or more particular words can be determined to be associated with the visual intent based on a common association with images and/or with image features. In some implementations, the natural language meaning of the word or phrase may be utilized to determine that the one or more particular words are associated with the visual intent.

Additionally and/or alternatively, one or more machine-learned models (e.g., a visual intent determination model 508) can be utilized to determine the one or more particular words are associated with a visual intent. A visual intent determination model 508 can parse the text data, process each segment to provide a classification for each segment, and generate output data 510 descriptive of whether the text data includes one or more particular words associated with a visual intent. Alternatively and/or additionally, the visual intent determination model 508 can include a natural language processing model that can process the text data as a whole and/or in various syntactically determined segments to generate the output data 510.

Based on the determination of one or more particular words being associated with a visual intent, an indicator 506 can be provided for display. The indicator 506 can include the one or more particular words having a different color and/or changing colors. The indicator 506 and/or one or more other user interface elements may be selected. A text-to-image replacement interface 512 may then be provided. A user can then choose whether to search a user-specific image gallery, capture a new image, and/or search the web (e.g., network of computing systems) for a particular image 514 to be utilized in place of and/or with a portion of the text data 502.

The selected particular image 514 can then be utilized to augment the text data 502 to generate augmented data 516 that can include both text and image data. In some implementations, the selected particular image 514 may be processed before augmenting the text data 502. For example, the particular image 514 may be processed by one or more machine-learned models (e.g., a cropping model 518) to generate an augmented image to add to the text data 502. In particular, the particular image 514 may be processed by a cropping model 518 to determine one or more portions of the particular image 514 to segment to generate a cropped image 520. The cropped image 520 can then be utilized to generate the augmented data 516. The cropping model 518 can include one or more detection models, one or more classification models, and/or one or more segmentation models. The cropping model may determine one or more objects are depicted in the particular image 514, can determine one or more regions associated with the one or more objects, and can provide suggested cropping regions to a user. Alternatively and/or additionally, the cropping model 518 can determine which of a plurality of regions of the particular image 514 is associated with the one or more particular words. For example, if the one or more particular words include "pattern", the cropping model 518 may determine to segment a portion of a dress with stripes over segmenting a solid wallpaper of a wall.

Example Methods

Figure 6:
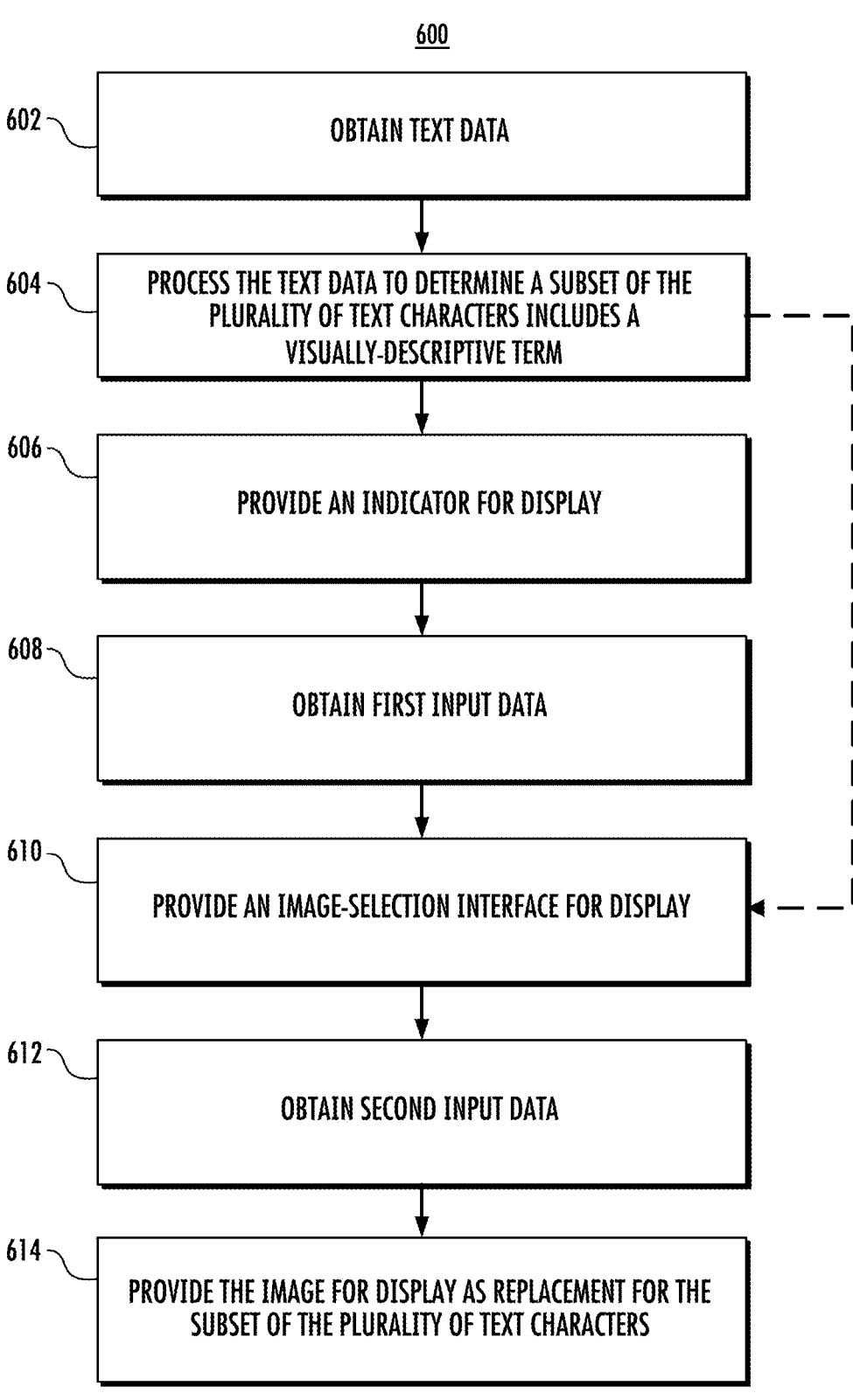
FIG. 6 depicts a flow chart diagram of an example method to perform text-to-image replacement according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain text data. The text data can be descriptive of a plurality of text characters. The plurality of text characters can be descriptive of one or more words. The plurality of characters may be obtained via one or more inputs to a user interface. Alternatively and/or additionally, the text data may be generated by processing audio data associated with a spoken utterance.

At 604, the computing system can process the text data to determine a subset of the plurality of text characters includes a visually-descriptive term. The visually-descriptive term can be associated with one or more visual features. In some implementations, the visually-descriptive term can be determined based on historical search data. The historical search data can be descriptive of a plurality of terms that are utilized to obtain one or more image search results. In some implementations, the visually-descriptive term can be determined based on processing the text data with a semantic understanding model. The visual descriptive term may be determined based on historical click data. The historical selection data may be global selection data, user-specific historical selection data, region-specific historical selection data, and/or context-specific historical selection data. In some implementations, the historical selection data can be descriptive of a frequency of an image search tab being selected when the particular term is input.

At 606, the computing system can provide an indicator for display. The indicator can be descriptive of a text replacement option for replacing the visually-descriptive term with image data. The indicator can include the subset of the plurality of text characters being displayed in one or more colors that differ from the remaining characters of the plurality of text characters. In some implementations, the indicator can include a pop-up user-interface element. The indicator may include highlighting the one or more words, underlining the one or more words, circling the one or more words, and/or flashing the one or more words.

At 608, the computing system can obtain first input data. The first input data can be descriptive of a first selection of the text replacement option. The first input data can be descriptive of an audio input (e.g., a voice command), a touch input (e.g., an input to a touchscreen), a keyboard input, and/or a mouse input. The first input data can include a selection of the indicator.

At 610, the computing system can provide an image-selection interface for display. The image-selection interface can include a plurality of images for selection. In some implementations, the plurality of images are obtained based at least in part on the visually-descriptive term. The plurality of images can be obtained by determining image data in a user-specific image database is associated with the one or more visual features. The computing system can determine the image data associated with the one or more visual features includes the plurality of images. In some implementations, plurality of images can be obtained based on the one or more visually-descriptive terms.

In some implementations, the plurality of images can be obtained by querying a search engine with the subset of the plurality of text characters and receiving the plurality of images. The query utilized to query the search engine can include the visually-descriptive term. Additionally and/or alternatively, the one or more contexts can be obtained and/or determined. The one or more contexts can then be utilized to refine the search. The one or more contexts can include user-specific information (e.g., a location of the user, application history, user's search history, user's purchase history, user preferences, and/or user profiles). In some implementations, the one or more contexts can include a time of day, a time of week, a time of year, global trends, and/or past selections of images when the particular visually-descriptive term is utilized.

Additionally and/or alternatively, providing the image-selection interface for display can include providing an image search option, a user-image database option, and an image-capture option. The image search option can include querying the web with the subset of the plurality of text characters. The user-image database option can include obtaining images from a user-image database. The image-capture option can include utilizing one or more image sensors of a user device. The user-image database can be associated with one or more user profiles and may be associated with one or more image gallery applications. In some implementations, the user-image database option can allow for the selection of locally stored data. Alternatively and/or additionally, the user-image database option can enable a user to select images stored in association with the user in one or more image storage applications, which can include cloud storage, server storage, and/or local storage.

In some implementations, the computing system can provide the image-selection interface without providing an indicator and/or without obtaining first input data. For example, the computing system may perform 604 then 610 without performing 606 and 608.

At 612, the computing system can obtain second input data. The second input data (or selection data) can be descriptive of a second selection of an image. The second input data can be descriptive of an audio input (e.g., a voice command), a touch input (e.g., an input to a touchscreen), a keyboard input, and/or a mouse input. The first input data can include a selection of a selection icon, a selection of a thumbnail, and/or a drop and drag selection.

At 614, the computing system can provide the image for display as replacement for the subset of the plurality of text characters. For example, the subset of the plurality of text characters may be removed, and the image may be added in the position of the subset of the plurality of text characters before deletion.

In some implementations, the plurality of text characters can include the subset of the plurality of text characters and a second subset. The computing system may include processing the image and the second subset to determine a plurality of search results. In some implementations, the plurality of search results can be determined based on the image and the second subset. The plurality of search results can then be provided in a search results page interface.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a search query. The search query can include one or more words. In some implementations, obtaining the search query can include obtaining the search query via a query box of a search interface. The search interface can be provided by a web platform, a mobile application, and/or a desktop application. The search query can include Boolean terms and syntax and/or natural language structure.

At 704, the computing system can determine the one or more words include a visual intent. The visual intent can be associated with one or more visual features. The visual intent can be based on the one or more words being associated with a color, a pattern, a design, an object, and/or a visual feature. The association can be based on the one or more words being visual descriptors, the one or more words being associated with a label for a specific visual feature, and/or the one or more words being associated with past image search queries. Words describing a color, a pattern, a shape, and/or other visual descriptors may be determined to include a visual intent.

At 706, the computing system can provide a user interface element. In some implementations, the user interface element can be descriptive of a text replacement option. The user interface element can be an indicator that indicates the systems and methods have determined the one or more words are associated with a visual intent. The user interface element can include a visual effect. The user interface element can include a pop-up element, a dropdown menu, a change to the display of the one or more words, and/or the appearance of an icon.

At 708, the computing system can obtain first input data. The first input data can be descriptive of a first selection of the text replacement option. The first input data can include sensor data. The first input data may be descriptive of an interaction with the user interface element (e.g., a tap input, a gesture input, and/or a lack of an input via a threshold amount of time elapsing without an input being obtained).

At 710, the computing system can provide an image-selection interface for display. The image-selection interface can include a plurality of images for selection. In some implementations, the image-selection interface can be provided for display based on the determination of the one or more words including a visual intent. The image-selection interface may include one or more different tabs for viewing and selecting images from different databases and/or images of different mediums or types. The image-selection interface may include one or more panels for providing different types of media content items and/or media content items from different sources.

In some implementations, the computing system can provide the image-selection interface without providing an indicator and/or without obtaining first input data. For example, the computing system may perform 704 then 710 without performing 706 and 708.

At 712, the computing system can obtain selection data. The selection data (e.g., second input data) can be descriptive of a second selection of an image. The selection data can include sensor data. The selection data may be descriptive of an interaction with the image-selection interface (e.g., a tap input, a gesture input, and/or a lack of an input via a threshold amount of time elapsing without an input being obtained).

At 714, the computing system can provide the image for display as replacement for the one or more words. For example, a preview and/or a thumbnail for the image may be provided for display in the query box of the search interface.

At 716, the computing system can determine one or more search results associated with the image. In some implementations, the one or more search results can be provided via a search results page. The search results page can include a query box that displays the image. Additionally and/or alternatively, the search results page can include a search results panel for displaying information associated with the one or more search results. The search query can include one or more additional words. In some implementations, the one or more search results can be determined at least in part on the one or more additional words. The one or more search results may include one or more image search results. Additionally and/or alternatively, the one or more search results can include one or more product search results descriptive of products associated with the one or more visual features of the image.

At 718, the computing system can provide the one or more search results as an output. The one or more search results may be provided for display in a search results page interface. The search results may be provided in different panels based on the type of search result, the source of the search result, and/or the classification of the search result.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of words. The plurality of words can include one or more particular words and one or more additional words. The one or more particular words can include visually descriptive terms. The one or more additional words may be complementary to the one or more particular words and/or may be directed to a different descriptive aspect of a search query or phrase.

At 804, the computing system can determine the one or more particular words of the plurality of words include a visual intent. The visual intent can be associated with one or more visual features. The determination can be based on processing the plurality of words with one or more machine-learned models to generate one or more outputs. The one or more machine-learned models can include one or more detection models, one or more segmentation models, one or more classification models, and/or one or more augmentation models. In some implementations, the one or more machine-learned models can include one or more natural language processing models. The one or more machine-learned models can include one or more transformer models. In some implementations, the determination may be based on historical search data.

At 806, the computing system can provide the plurality of words for display with an indicator identifying the one or more particular words. The indicator can be a visual indicator that is descriptive of one or more possible actions that can be performed based on the identified one or more particular words. The indicator may include a description, may include a text color change, may include a highlight, and/or may include a pop-up element.

At 808, the computing system can determine a plurality of images associated with the one or more particular words. Additionally and/or alternatively, the plurality of images can be associated with the visual intent. The determination may be based on querying a database with the one or more particular words. The database may be a local database stored on a user's device and/or may be a database accessed over a network connection. The one or more images may be cropped to isolate a particular portion of the image associated with the one or more particular words.

At 810, the computing system can provide the plurality of images in a user interface panel. The user interface panel can include a plurality of interactive user interface elements associated with the plurality of images. The user interface panel may be a pop-up panel and/or may replace a portion of the originally displayed interface.

At 812, the computing system can obtain a selection of a particular image of the plurality of images. In some implementations, the particular image can be a cropped image from an image database. The cropped image may be generated by processing an uncropped image with one or more machine-learned models to detect a relevant portion of the image and segment the relevant portion from the uncropped image.

At 814, the computing system can provide the one or more additional words and the particular image for output without the one or more particular words. The particular image can be positioned in the location where the one or more particular words were previously displayed. In some implementations, a thumbnail and/or a preview may be provided for display in place of the full particular image.

In some implementations, the computing system can include processing the output to generate a translation output. The translation output can be generated based at least in part on the particular image.

Alternatively and/or additionally, the computing system can include providing the output to a search engine and receiving a plurality of search results. The plurality of search results may be associated with the one or more additional words and the particular image.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining text data, wherein the text data is descriptive of a plurality of text characters, wherein the plurality of text characters are associated with a text string comprising one or more words and one or more additional words, and wherein the one or more additional words are associated with a different descriptive aspect of the search query than the one or more words;
processing the plurality of text characters to determine a first plurality of search results;
processing the text data to determine a subset of the plurality of text characters associated with the one or more words comprise a visually-descriptive term, wherein the visually-descriptive term is associated with one or more visual features;
in response to determining the one or more words comprise the visually-descriptive term, providing an indicator for display with the first plurality of search results, wherein the indicator is descriptive of a text replacement option for replacing the visually-descriptive term with image data;
in response to obtaining first input data descriptive of a first selection of the text replacement option, providing an image-selection interface for display, wherein the image-selection interface comprises a plurality of images for selection, wherein the plurality of images are obtained based at least in part on the visually-descriptive term;
obtaining second input data, wherein the second input data is descriptive of a selection of an image;
replacing the one or more words with the image to generate a multimodal search query;
providing the image for display as replacement for the subset of the plurality of text characters;
determining a plurality of second search results associated with the one or more additional words and the one or more visual features of the image; and
providing the plurality of second search results as an output.

2. The system of claim 1, wherein obtaining the second input data comprises:
receiving the selection of the image; and
cropping the image.

3. The system of claim 2, wherein cropping the image comprises:
processing the image with one or more machine-learned models to detect a relevant portion of the image and segment the relevant portion from the image.

4. The system of claim 2, wherein cropping the image comprises:
cropping the image to isolate a particular portion of the image associated with the visually-descriptive term.

5. The system of claim 2, wherein cropping the image comprises:
providing a cropping interface for display;
processing the image to determine a suggested cropping region;
providing the suggested cropping region for display; and
cropping the image based on a user input received via the cropping interface.

6. The system of claim 1, wherein the operations further comprise:
in response to determining the subset of the plurality of text characters associated with the one or more words comprise the visually-descriptive term, searching a user-image database based on the subset of the plurality of text characters to determine the plurality of images responsive to the visually-descriptive term, wherein the user-image database comprises images associated with one or more user profiles associated with one or more image gallery applications.

7. The system of claim 6, wherein the plurality of images are obtained from locally stored data associated with a user computing device.

8. The system of claim 1, wherein processing the text data to determine the subset of the plurality of text characters associated with the one or more words comprise the visually-descriptive term comprises:
parsing the text data;
processing each segment to provide a classification for each segment; and
generating output data descriptive of whether the text data includes one or more particular words associated with a visual intent.

9. The system of claim 8, wherein the output data is generated with an intent determination model.

10. The system of claim 9, wherein the intent determination model comprises a natural language processing model.

11. A computer-implemented method, the method comprising:
obtaining, by a computing system comprising one or more processors, text data, wherein the text data is descriptive of a plurality of text characters, wherein the plurality of text characters are associated with a text string comprising one or more words and one or more additional words, and wherein the one or more additional words are associated with a different descriptive aspect of the search query than the one or more words;
processing, by the computing system, the plurality of text characters to determine a first plurality of search results;
processing, by the computing system, the text data to determine a subset of the plurality of text characters associated with the one or more words comprise a visually-descriptive term, wherein the visually-descriptive term is associated with one or more visual features;
in response to determining the one or more words comprise the visually-descriptive term, providing, by the computing system, an indicator for display with the first plurality of search results, wherein the indicator is descriptive of a text replacement option for replacing the visually-descriptive term with image data;

in response to obtaining first input data descriptive of a first selection of the text replacement option, providing, by the computing system, an image-selection interface for display, wherein the image-selection interface comprises a plurality of images for selection, wherein the plurality of images are obtained based at least in part on the visually-descriptive term;

obtaining, by the computing system, second input data, wherein the second input data is descriptive of a selection of an image;

replacing, by the computing system, the one or more words with the image to generate a multimodal search query;

providing, by the computing system, the image for display as replacement for the subset of the plurality of text characters;

determining, by the computing system, a plurality of second search results associated with the one or more additional words and the one or more visual features of the image; and providing, by the computing system, the plurality of second search results as an output.

12. The method of claim 11, wherein the indicator comprises a pop-up user interface element.

13. The method of claim 11, wherein processing, by the computing system, the text data to determine the subset of the plurality of text characters associated with the one or more words comprise the visually-descriptive term comprises:

determining the one or more words comprise the visually-descriptive term based on historical search data.

14. The method of claim 11, wherein the indicator comprises at least one of highlighting the one or more words, underlining the one or more words, circling the one or more words, or flashing the one or more words.

15. The method of claim 11, wherein the visually-descriptive term is associated with a visual feature.

16. The method of claim 11, wherein the visually-descriptive term is associated with at least one of a color, a pattern, a design, or an object.

17. One or more non-transitory computer-readable media that collectively store instructions that, when executed by one or more computing devices, cause the one or more computing devices to perform operations, the operations comprising:

obtaining text data, wherein the text data is descriptive of a plurality of text characters, wherein the plurality of text characters are associated with a text string comprising one or more words and one or more additional words, and wherein the one or more additional words are associated with a different descriptive aspect of the search query than the one or more words;

processing the plurality of text characters to determine a first plurality of search results;

processing the text data to determine a subset of the plurality of text characters associated with the one or more words comprise a visually-descriptive term, wherein the visually-descriptive term is associated with one or more visual features;

in response to determining the one or more words comprise the visually-descriptive term, providing an indicator for display with the first plurality of search results, wherein the indicator is descriptive of a text replacement option for replacing the visually-descriptive term with image data;

in response to obtaining first input data descriptive of a first selection of the text replacement option, providing an image-selection interface for display, wherein the image-selection interface comprises a plurality of images for selection, wherein the plurality of images are obtained based at least in part on the visually-descriptive term;

obtaining second input data, wherein the second input data is descriptive of a selection of an image;

replacing the one or more words with the image to generate a multimodal search query;

providing the image for display as replacement for the subset of the plurality of text characters;

determining a plurality of second search results associated with the one or more additional words and the one or more visual features of the image; and providing the plurality of second search results as an output.

18. The one or more non-transitory computer-readable media of claim 17, wherein processing the text data to determine the subset of the plurality of text characters associated with the one or more words comprise the visually-descriptive term comprises:

processing the text data with a machine-learned model to determine the subset of the plurality of text characters associated with the one or more words comprise the visually-descriptive term.

19. The one or more non-transitory computer-readable media of claim 17, wherein the image-selection interface comprises a cropping option for at least one of manually cropping the image or automatically cropping the image.

20. The one or more non-transitory computer-readable media of claim 19, wherein the cropping option comprises: processing the image and one or more inputs with a cropping model.

* * * * *